United States Patent
Ella et al.

(10) Patent No.: US 12,165,011 B2
(45) Date of Patent: Dec. 10, 2024

(54) ERROR DETECTION MECHANISM FOR QUANTUM BITS

(71) Applicant: Quantum Machines, Tel Aviv (IL)

(72) Inventors: Lior Ella, Tel Aviv (IL); Nissim Ofek, Tel Aviv (IL); Niv Drucker, Tel Aviv (IL); Itamar Sivan, Tel Aviv (IL); Yonatan Cohen, Tel Aviv (IL)

(73) Assignee: Q.M Technologies Ltd. (IL)

( * ) Notice: Subject to any disclaimer, the term of this patent is extended or adjusted under 35 U.S.C. 154(b) by 289 days.

(21) Appl. No.: 17/751,873

(22) Filed: May 24, 2022

(65) Prior Publication Data

US 2022/0405629 A1 Dec. 22, 2022

Related U.S. Application Data

(60) Provisional application No. 63/212,654, filed on Jun. 19, 2021.

(51) Int. Cl.
*G06N 10/70* (2022.01)
*G06N 10/40* (2022.01)

(52) U.S. Cl.
CPC ............. *G06N 10/70* (2022.01); *G06N 10/40* (2022.01)

(58) Field of Classification Search
CPC ............................... G06N 10/70; G06N 10/40
See application file for complete search history.

(56) References Cited

U.S. PATENT DOCUMENTS

| | | |
|---|---|---|
| 4,875,484 A | 10/1989 | Anzai et al. |
| 5,063,354 A | 11/1991 | Lauper et al. |
| 5,194,907 A | 3/1993 | Hayashi |
| 6,223,228 B1 | 4/2001 | Ryan et al. |
| 6,426,984 B1 | 7/2002 | Perino et al. |
| 6,993,108 B1 | 1/2006 | Chi et al. |
| 7,451,292 B2 | 11/2008 | Routt |
| 7,535,931 B1 | 5/2009 | Zampetti et al. |
| 7,627,126 B1 | 12/2009 | Pikalo |
| 8,315,969 B2 | 11/2012 | Roetteler |
| 8,385,878 B2 | 2/2013 | Rao |
| 8,750,717 B1 | 6/2014 | Yap et al. |
| 9,207,672 B2 | 12/2015 | Williams |
| 9,400,499 B2 | 7/2016 | Williams |

(Continued)

FOREIGN PATENT DOCUMENTS

| | | |
|---|---|---|
| CA | 2420022 | 2/2003 |
| CN | 1808103 A | 7/2006 |

(Continued)

OTHER PUBLICATIONS

U.S. Appl. No. 62/294,966, filed Feb. 12, 2016.

(Continued)

*Primary Examiner* — Jigar P Patel
(74) *Attorney, Agent, or Firm* — McAndrews, Held & Malloy, Ltd.

(57) ABSTRACT

A feedback controller is provided to generate a quantum feedback operation to control one or more ancilla qubits in a quantum error correcting code. The quantum feedback operation is based on the measurement of the one or more ancilla qubits. The feedback controller is operable to dynamically adjust a state discrimination according to previous measurements of the one or more ancilla qubits.

36 Claims, 8 Drawing Sheets

(56) References Cited

U.S. PATENT DOCUMENTS

| | | | |
|---|---|---|---|
| 9,509,324 B2 | 11/2016 | McDonald et al. | |
| 9,663,358 B1 | 5/2017 | Cory et al. | |
| 9,692,423 B2 | 6/2017 | McDermott, III | |
| 9,847,121 B2 | 12/2017 | Frank | |
| 9,858,531 B1 | 1/2018 | Monroe | |
| 9,892,365 B2 | 2/2018 | Rigetti | |
| 9,978,020 B1 | 5/2018 | Gambetta | |
| 9,979,400 B1 | 5/2018 | Sete | |
| 9,996,801 B2 | 6/2018 | Shim | |
| 10,063,228 B2 | 8/2018 | Deurloo et al. | |
| 10,122,351 B1 | 11/2018 | Naaman | |
| 10,127,499 B1 | 11/2018 | Rigetti | |
| 10,192,168 B2 | 1/2019 | Rigetti | |
| 10,223,643 B1 | 3/2019 | Bishop et al. | |
| 10,248,491 B1* | 4/2019 | Zeng | G06F 11/1048 |
| 10,333,503 B1 | 6/2019 | Cohen et al. | |
| 10,454,459 B1 | 10/2019 | Cohen | |
| 10,496,069 B2 | 12/2019 | Nazarathy et al. | |
| 10,505,524 B1 | 12/2019 | Cohen | |
| 10,560,076 B1 | 2/2020 | Cohen | |
| 10,637,449 B1 | 4/2020 | Cohen et al. | |
| 10,659,018 B1 | 5/2020 | Cohen | |
| 10,666,238 B1 | 5/2020 | Cohen | |
| 10,958,253 B1 | 3/2021 | Cohen et al. | |
| 10,985,739 B2 | 4/2021 | Cohen et al. | |
| 11,010,145 B1 | 5/2021 | Smith et al. | |
| 11,463,075 B2 | 1/2022 | Cohen et al. | |
| 11,616,497 B2 | 3/2023 | Cohen et al. | |
| 11,616,498 B2 | 3/2023 | Cohen et al. | |
| 2002/0004876 A1 | 1/2002 | Timmer et al. | |
| 2004/0266084 A1 | 12/2004 | Fujishima et al. | |
| 2005/0015422 A1 | 1/2005 | Kohn et al. | |
| 2005/0180575 A1 | 8/2005 | Maeda et al. | |
| 2006/0093376 A1 | 5/2006 | Mitchell et al. | |
| 2008/0037693 A1 | 2/2008 | Andrus et al. | |
| 2009/0268901 A1 | 10/2009 | Lodewyck et al. | |
| 2010/0072979 A1 | 3/2010 | Fefer et al. | |
| 2011/0035511 A1 | 2/2011 | Biederman | |
| 2013/0198499 A1 | 8/2013 | Dice et al. | |
| 2016/0125311 A1 | 5/2016 | Fuechsle et al. | |
| 2016/0267032 A1 | 9/2016 | Rigetti et al. | |
| 2016/0292586 A1 | 10/2016 | Rigetti et al. | |
| 2017/0094618 A1 | 3/2017 | Bjorkengren | |
| 2017/0214410 A1 | 7/2017 | Hincks et al. | |
| 2017/0364796 A1 | 12/2017 | Wiebe | |
| 2018/0013426 A1 | 1/2018 | Deurloo et al. | |
| 2018/0032893 A1 | 2/2018 | Epstein | |
| 2018/0091244 A1 | 3/2018 | Abdo | |
| 2018/0107579 A1 | 4/2018 | Chapman | |
| 2018/0123597 A1 | 5/2018 | Sete | |
| 2018/0237039 A1 | 8/2018 | Mong et al. | |
| 2018/0260245 A1 | 9/2018 | Smith | |
| 2018/0260730 A1 | 9/2018 | Reagor | |
| 2018/0260732 A1 | 9/2018 | Bloom | |
| 2018/0308007 A1 | 10/2018 | Amin | |
| 2018/0322409 A1 | 11/2018 | Barends | |
| 2018/0365585 A1 | 12/2018 | Smith | |
| 2018/0373995 A1 | 12/2018 | Tomaru et al. | |
| 2018/0375650 A1 | 12/2018 | Legre | |
| 2019/0042964 A1 | 2/2019 | Elsherbini et al. | |
| 2019/0042965 A1 | 2/2019 | Clarke | |
| 2019/0042970 A1 | 2/2019 | Zou | |
| 2019/0042971 A1 | 2/2019 | Zou | |
| 2019/0042972 A1 | 2/2019 | Zou | |
| 2019/0042973 A1 | 2/2019 | Zou | |
| 2019/0049495 A1 | 2/2019 | Ofek | |
| 2019/0251478 A1 | 8/2019 | Bishop et al. | |
| 2019/0266512 A1 | 8/2019 | Shen et al. | |
| 2019/0302832 A1 | 10/2019 | Morgan et al. | |
| 2019/0317589 A1 | 10/2019 | Mathur et al. | |
| 2019/0385088 A1 | 12/2019 | Naaman et al. | |
| 2020/0119748 A1* | 4/2020 | Lucarelli | H03M 13/11 |
| 2020/0293080 A1 | 9/2020 | Poon et al. | |
| 2020/0364602 A1 | 11/2020 | Niu et al. | |
| 2021/0004707 A1 | 1/2021 | Gambetta et al. | |
| 2021/0103847 A1 | 4/2021 | Akzam | |
| 2021/0125096 A1 | 4/2021 | Puri et al. | |
| 2021/0286601 A1* | 9/2021 | Fitzsimons | G06F 8/4441 |
| 2021/0359670 A1 | 11/2021 | Cohen et al. | |
| 2022/0172050 A1* | 6/2022 | Dalli | G06N 3/045 |
| 2022/0269963 A1* | 8/2022 | Delfosse | G06F 16/9024 |

FOREIGN PATENT DOCUMENTS

| | | |
|---|---|---|
| CN | 104467843 | 3/2015 |
| CN | 105281886 A | 1/2016 |
| CN | 105912070 A | 8/2016 |
| CN | 107408223 A | 11/2017 |
| CN | 108111306 A | 6/2018 |
| CN | 108594214 A | 9/2018 |
| CN | 108698815 A | 10/2018 |
| CN | 109165744 A | 1/2019 |
| CN | 110085094 A | 8/2019 |
| CN | 108780129 A | 11/2019 |
| CN | 111464154 A | 7/2020 |
| CN | 110677210 | 10/2020 |
| CN | 111767055 A | 10/2020 |
| CN | 112019193 A | 12/2020 |
| CN | 112149832 A | 12/2020 |
| EP | 0388052 | 9/1990 |
| JP | 2007049009 A | 2/2007 |
| JP | 2018137739 A | 2/2007 |
| JP | 2011175078 A | 9/2011 |
| JP | 2012188875 | 10/2012 |
| WO | 2015178991 A2 | 11/2015 |
| WO | 2015178992 A2 | 11/2015 |
| WO | 2017078735 A1 | 5/2017 |
| WO | 2017123940 | 7/2017 |
| WO | 2017139683 A1 | 8/2017 |
| WO | 2018055607 | 3/2018 |
| WO | 2018062991 A1 | 4/2018 |
| WO | 2019063117 A1 | 4/2019 |
| WO | 2020033807 A1 | 2/2020 |
| WO | 2020231795 A1 | 11/2020 |
| WO | 2021123903 | 6/2021 |

OTHER PUBLICATIONS

Int'l Search Report and Written Opinion Appln No. PCT/IB2019/001410 mailed Jun. 10, 2020.

Int'l Search Report and Written Opinion Appln No. PCT/IB2019/001394 mailed Jun. 17, 2020.

Zhang J, Hegde SS, Suter D. Pulse sequences for controlled 2- and 3-qubit gates in a hybrid quantum register. arXiv preprint arXiv:1806.08408. Jun. 21, 2018.

Wang CY, Kuznetsova L, Gkortsas VM, Diehl L, Kaertner FX, Belkin MA, Belyanin A, Li X, Ham D, Schneider H, Grant P. Mode-locked pulses from mid-infrared quantum cascade lasers. Optics Express. Jul. 20, 2009;17(15):12929-43.

Int'l Search Report and Written Opinion Appln No. PCT/IB2020/000218 mailed Aug. 11, 2020.

Quan R, Zhai Y, Wang M, Hou F, Wang S, Xiang X, Liu T, Zhang S, Dong R. Demonstration of quantum synchronization based on second-order quantum coherence of entangled photons. Scientific reports. Jul. 25, 2016;6:30453. Jul. 25, 2016 (Jul. 25, 2016).

Int'l Search Report and Written Opinion Appln No. PCT/IB2020/000376 mailed Sep. 17, 2020.

Breitfelder et al. eds., IEEE 100: The Authoritative Dictionary of IEEE Standards Terms 1247, definition 2 of "variable" (7th ed. 2000). (Year: 2000).

Int'l Search Report and Written Opinion Appln No. PCT/IB2020/000707 mailed Jan. 12, 2021.

National Academies of Sciences, Engineering, and Medicine. "Quantum Computing: Progress and Prospects". eprint (Dec. 2018) [online]. [retrieved on Jan. 7, 2020]. retrieved from: <https://doi.org/10.17226/25196.> Dec. 4, 2018 (Dec. 4, 2018) pp. 114, 142, 210, Fig. 2.5, Qiskit Backend Specifications at footnote 57: section 4.2, 5.1.5, Fig. 3, Fig. 4 , pp. 30, 57.

IBM Research. "Qiskit Backend Specifications for OpenQASM and OpenPulse Experiments". eprint arXiv:1809.03452v1 (Sep. 10,

(56) References Cited

OTHER PUBLICATIONS

2018) [online]. [retrieved on Jan. 7, 2020]. retrieved from: <https://arxiv.org/pdf/1809.03452.pdf> Sep. 10, 2018 (Sep. 10, 2018) section 4.2, 5.1.5, Fig. 3, Fig. 4, pp. 30, 57.
Int'l Search Report and Written Opinion Appln No. PCT/IB2020/000704 mailed Jan. 17, 2021.
Wolfowicz, et al. Pulse Techniques for Quantum Information Processing University of Chicago, University College London, eMagRes, 2016, vol. 5: 1515-1528. DOI 10.1002/9780470034590.emrstm1521.
Int'l Search Report and Written Opinion Appln No. PCT/IB2020/000555 mailed Dec. 27, 2020.
Int'l Search Report and Written Opinion Appln No. PCT/IB2020/000760 mailed Jan. 27, 2021.
"Quantum-classical interface based on single flux quantum digital logic". In: Quantum Science and Technology 3.2 (2018), pp. 1-16. DOI: 10.1088/2058-9565/aaa3a0.(retrieved on Jan. 20, 2021). Retrieved from the Internet: <https://arxiv.org/pdf/1710.04645.pdf> McDermott R. et al. Oct. 12, 2017 (Oct. 12, 2017) Section VI, VII, VIII.
Roffe, J., Quantum Error Correction: An Introductory Guide, Dept. of Physics & Astronomy, Univ. of Sheffeld, UK, Oct. 10, 2019, pp. 1-29.
Int'l Search Report and Written Opinion Appln No. PCT/IB2020/001004 mailed May 13, 2021.
Int'l Preliminary Report on Patentability Appln No. PCT/IB2019/001410 mailed Jun. 10, 2021.
Int'l Search Report and Written Opinion Appln No. PCT/IB2021/000067 mailed Jun. 21, 2021.
Int'l Preliminary Report on Patentability Appln No. PCT/IB2019/001394 mailed Jul. 29, 2021.
Int'l Preliminary Report on Patentability Appln No. PCT/IB2020/000218 mailed Sep. 16, 2021.
Int'l Preliminary Report on Patentability Appln No. PCT/IB2020/000376 mailed Nov. 12, 2021.
Int'l Search Report and Written Opinion Appln No. PCT/IB2021/056254 mailed Dec. 1, 2021.
Ribeiro, Diogo C., Pedro M. Cruz, and Nuno Borges Carvalho, "Towards a denser frequency grid in phase measurements using mixer-based receivers." 2015 85th Microwave Measurement Conference (ARFTG). IEEE, 2015. Dec. 31, 2015 (Dec. 31, 2015).
Int'l Preliminary Report on Patentability Appln No. PCT/IB2020/000555 mailed Feb. 10, 2022.
Int'l Preliminary Report on Patentability Appln No. PCT/IB2020/000707 mailed Mar. 17, 2022.
Int'l Preliminary Report on Patentability Appln No. PCT/IB2020/000704 mailed Mar. 17, 2022.
Int'l Preliminary Report on Patentability Appln No. PCT/IB2020/000760 mailed Apr. 7, 2022.
Int'l Search Report and Written Opinion Appln No. PCT/IB2022/050190 mailed Apr. 11, 2022.
Extended European Search Report Appln No. 19889443.8 dated Aug. 4, 2022.
Int'l Search Report and Written Opinion Appln No. PCT/IB2022/054903 mailed Sep. 8, 2022.
Int'l Preliminary Report on Patentability Appln No. PCT/IB2021/000067 mailed Sep. 22, 2022.
European Office Communication with extended Search Report Appln No. 20845965.1 dated Jun. 29, 2023.
European Office Communication with extended Search Report Appln No. 20861242.4 dated Jul. 7, 2023.
European Office Communication with extended Search Report Appln No. 23153085.8 dated Jul. 3, 2023.
Yang Yet al: "FPGA-based electronic system for the control and readout of superconducting qubit systems", arxiv.org, Cornell University Library, 201 Yang Yet al: "FPGA-based electronic system for the control and readout of superconducting qubit systems", arxiv.org, Cornell University Library, 201 Olin Library Cornell University Ithaca, NY 14853, Oct. 15, 2021 (Oct. 15, 2021), XP091078848.
Gebauer Richard et al: "A modular RFSoC-based approach to interface superconducting quantum bits", 2021 International Conference on Field-Programmable Technology (ICFPT), IEEE, Dec. 6, 2021 (Dec. 6, 2021), pp. 1-9, XP034028257, DOI: 10.1109/ICFPT52863.2021.9609909 [retrieved on Nov. 8, 2021].
European Office Communication with extended Search Report Appln No. 20861100.4 dated Jul. 21, 2023.
Fu et al. "eQASM: An Executable Quantum 1-15 Instruction Set Architecture", 2019 IEEE International Symposium on High Performance Computer Architecture (HPCA), IEEE Feb. 16, 2019 (Feb. 16, 2019), pp. 224-237, XP033532496, DOI: 10.1109/HPCA.2019.00040 Retrieved from the Internet: URL: https://ieeexplore.ieee.org/abstract/document/8675197/authors#authors [retrieved on Mar. 26, 2019].
Yunong Shi et al: "Optimized Compilation of Aggregated Instructions for Realistic Quantum Computers", arxiv.org, Cornell University Library, 201 Olin Library Cornell University Ithaca, NY 14853, Feb. 4, 2019 (Feb. 4, 2019), XP081025321, DOI: 10.1145/3297858.3304018.
Chinese Patent Office Action Appln No. 2019800888907 with search report dated Jul. 28, 2023 with translation.
European Office Communication with extended Search Report Appln No. 20869503.1 dated Sep. 12, 2023.
Chinese Patent Office Action Appln No. 2019800902340 with search report dated Aug. 30, 2023 with translation.
Int'l Preliminary Report on Patentability Appln No. PCT/IB2022/050190 mailed Oct. 19, 2023.
Int'l Preliminary Report on Patentability Appln No. PCT/IB2022/000068 mailed Nov. 23, 2023.
Int'l Preliminary Report on Patentability Appln No. PCT/IB2022/000059 mailed Nov. 23, 2023.
Int'l Preliminary Report on Patentability Appln No. PCT/IB2022/000024 mailed Nov. 9, 2023.
Lavoie et al., "A Formalization for Specifying and Implementing Correct Pull-Stream Modules," in arXiv preprint arXiv: 1801.06144 (2018). (Year: 2018).
Fu et al., "A Microarchitecture for a Superconducting Quantum Processor," in 38.3 IEEE Micro 40-47 (2018). (Year: 2018).
Chinese Office Action Appln No. 2019800888907 dated Nov. 17, 2023.
European Office Communication with extended Search Report Appln No. 20902662.4.6 dated Dec. 21, 2023.
Int'l Preliminary Report on Patentability Appln No. PCT/IB2022/054903 mailed Dec. 28, 2023.
Int'l Search Report and Written Opinion Appln No. PCT/IB2022/000059 mailed Jul. 7, 2022.
Moreira, "QuTech Central Controller: A Quantum Control Architecture for a Surface-17 Logical Qubit." Delft University of Technology Student Theses Collection (2019). Available at the following URL: http://resolver.tudelft.nl/uuid:502ed5e5-87f7-42bd-a077-c24b7281cd94 May 10, 2019 (May 10, 2019).
Int'l Preliminary Report on Patentability Appln No. PCT/IB2020/001004 mailed Jun. 30, 2022.
Int'l Search Report and Written Opinion Appln No. PCT/IB2022/000024 mailed Jul. 18, 2022.
Baier, Simon, Matteo Pompili, Sophie LN Hermans, Hans KC Beukers, Peter C. Humphreys, Raymond N. Schouten, Raymond FL Vermeulen et al. "Realization of a Multi-Node Quantum Network of Remote Solid-State Qubits", Science, vol. 372, pp. 259-264 (2021) Baier Simon Apr. 16, 2021 (Apr. 16, 2021).
Int'l Search Report and Written Opinion Appln No. PCT/IB2022/000068 mailed Jul. 17, 2022.
D. Copsey et al., "Toward a scalable, silicon-based quantum computing architecture," in IEEE Journal of Selected Topics in Quantum Electronics, vol. 9, No. 6, pp. 1552-1569, Nov.-Dec. 2003, doi: 10.1109/JSTQE.2003.820922. Dec. 31, 2003 (Dec. 31, 2003).
Int'l Search Report and Written Opinion Appln No. PCT/IB2022/053304 mailed Oct. 6, 2022.
Serrano, Javier, M. Lipinski, T. Wlostowski, E. Gousiou, Erik van der Bij, M. Cattin, and G. Daniluk. "The white rabbit project." (2013) Sep. 19, 2013 (Sep. 19, 2013) Entire document.
Extended European Search Report Appln No. 19910800.2 dated Oct. 6, 2022.

(56) References Cited

OTHER PUBLICATIONS

Hornibrook J M et al: "Cryogenic Control Architecture for Large-Scale Quantum Computing", arxiv.org, Cornell University Library, 201 Olin Library Cornell University Ithaca, NY 14853, Sep. 8, 2014 (Sep. 8, 2014), XP081391509.
Fu X et al: "An Experimental Microarchitecture for a Superconducting Quantum Processor", MICRO-50 '17: Proceedings of the 50th Annual IEEE/ACM International Symposium on Microarchitecture, Cornell University Library, 201 Olin Library Cornell University Ithaca, NY 14853, Oct. 14, 2017 (Oct. 14, 2017), pp. 1-13, XP081291220.
Zopes J. et al: "High resolution quantum sensing with shaped control pulses", arxiv.org, Cornell University Library, 201 Olin Library Cornell University Ithaca, NY 14853, May 22, 2017 (May 22, 2017), XP081276850.
Cross et al. "Open Quantum Assembly Language", Jan. 10, 2017.
European Office Communication with extended Search Report Appln No. 20766036.6 dated Nov. 24, 2022.
Japanese Patent Office Action Appln No. 2021-529723 dated Oct. 26, 2022 with translation.

\* cited by examiner

Claim: when $f_{n+1} = f_n \oplus m_{n-1}$, we have:
$$m_n = \hat{p}_n \oplus \hat{p}_{n-1} = D_n$$
Proof:
$$m_n = \hat{p}_n \oplus f_n \oplus m_{n-1}$$
$$m_{n-1} = \hat{p}_{n-1} \oplus f_{n-1} \oplus m_{n-2} = \hat{p}_{n-1} \oplus f_n$$
$$\Rightarrow f_n = m_{n-1} \oplus \hat{p}_{n-1}$$
$$\Rightarrow m_n = \hat{p}_n \oplus m_{n-1} \oplus \hat{p}_{n-1} \oplus m_{n-1} = \hat{p}_n \oplus \hat{p}_{n-1} = D_n.$$

*Figure 6*

```
f = 0
r = 0
meas_outcome = 0 while true:
{
    f = f ^ r
    r = meas_outcome play('-Y/2', 'a0')
    cphase('d0', 'a0')
    cphase('d1', 'a0')
    play('Y/2' * amp(f ? -1 : 1)), 'a0')
    measure_state('a0') -> meas_outcome
}
```

*Figure 7*

ERROR DETECTION MECHANISM FOR QUANTUM BITS

PRIORITY CLAIM

This application claims the benefit of priority to U.S. Provisional Application No. 63/212,654, filed on Jun. 19, 2021, the entirety of which is hereby incorporated herein by reference.

BACKGROUND

The present disclosure relates to tracking of qubit errors in quantum computing systems. The disclosure provides a method that can be employed on ancilla-based error correcting codes, where errors on a data qubit are detected without compromising its quantum state by entangling it with an ancilla qubit and measuring the state of the ancilla qubit.

BRIEF SUMMARY

The present disclosure includes a novel method for improving the ability of error correction codes to detect qubit errors. Aspects of the invention make use of operations on measurement qubits which are conditional on previous measurement results thereof. Application of the disclosure is relevant for quantum computing systems which are comprised of qubits which can be coupled to each other to perform entangling operations, state measurement apparatuses capable of performing quantum-non-demolition measurements. The disclosure makes use of a quantum hardware controller capable of detecting the measured state of a qubit and applying operations based on that state within a time frame significantly shorter than the useful lifetime of the state of the qubit.

Aspects of the invention comprise of a state machine whose state is based on measurement results of ancilla qubits. These measurements are generated periodically during error correction cycles of a quantum system, and their outcome depends on the quantum operations applied to the ancilla and data qubits during their evolution, whether by deliberate design or due to errors. In particular, the measurement outcomes may depend on the parity, in some chosen basis, of the states of data qubits which are coupled to it via entangling gates. The state machine comprises of a finite number of states. These states determine which of a set of possible operations on the qubits are applied during the error correction cycle. The state machine is designed to minimize the probability that the operations performed on the qubits during the error cycle, both deliberately and due to noise, will lead to faulty error correction operations.

In addition to the above, aspects of the invention make use of a parallelization mechanism which enables quantum operations to be performed in parallel with the processing required to perform the conditional operations. This parallelization mechanism allows performance of conditional operations with a latency that is substantially shorter than the round-trip time between the quantum system and the hardware controllers.

BRIEF DESCRIPTION OF SEVERAL VIEWS OF THE DRAWINGS

FIG. 6 provides example proof that the measurement outcomes provide the error detection events.

FIG. 7 is an example pseudo-code implementation of a particular non-limiting example of the state system corresponding to the example in FIG. 4.

DETAILED DESCRIPTION

Various aspects of the present disclosure are presented by way of example. Such examples are non-limiting, and thus the scope of various aspects of the present disclosure should not necessarily be limited by any particular characteristics of the provided examples. The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component, or a first section could be termed a second element, a second component, or a second section without departing from the teachings of the present disclosure.

Aspects of the invention comprise an implementation of a feedback control mechanism which controls the quantum state of an ancilla qubit that is typically (but not always) used to measure the parity, in some chosen basis, of a quantum state of data qubits in an error correcting code. Feedback control is performed by measuring the state of the qubits and subsequently sending electromagnetic control to the qubits based on the measurement results.

The feedback controller employs a state machine with a particular state update logic that is designed to minimize the probability of readout errors from the measured qubits, as well as minimize the effect of the measurement on qubits that are not being measured.

The state machine may be implemented in practice using electronic programmable logic arrays, integrated circuit logic, software which is executed on a CPU or any other means which can store a representation of the state machine. The hardware will also affect the generation of electromagnetic pulses and quantum state estimation operations in a timely manner based on the state of the state machine.

Figure 1:
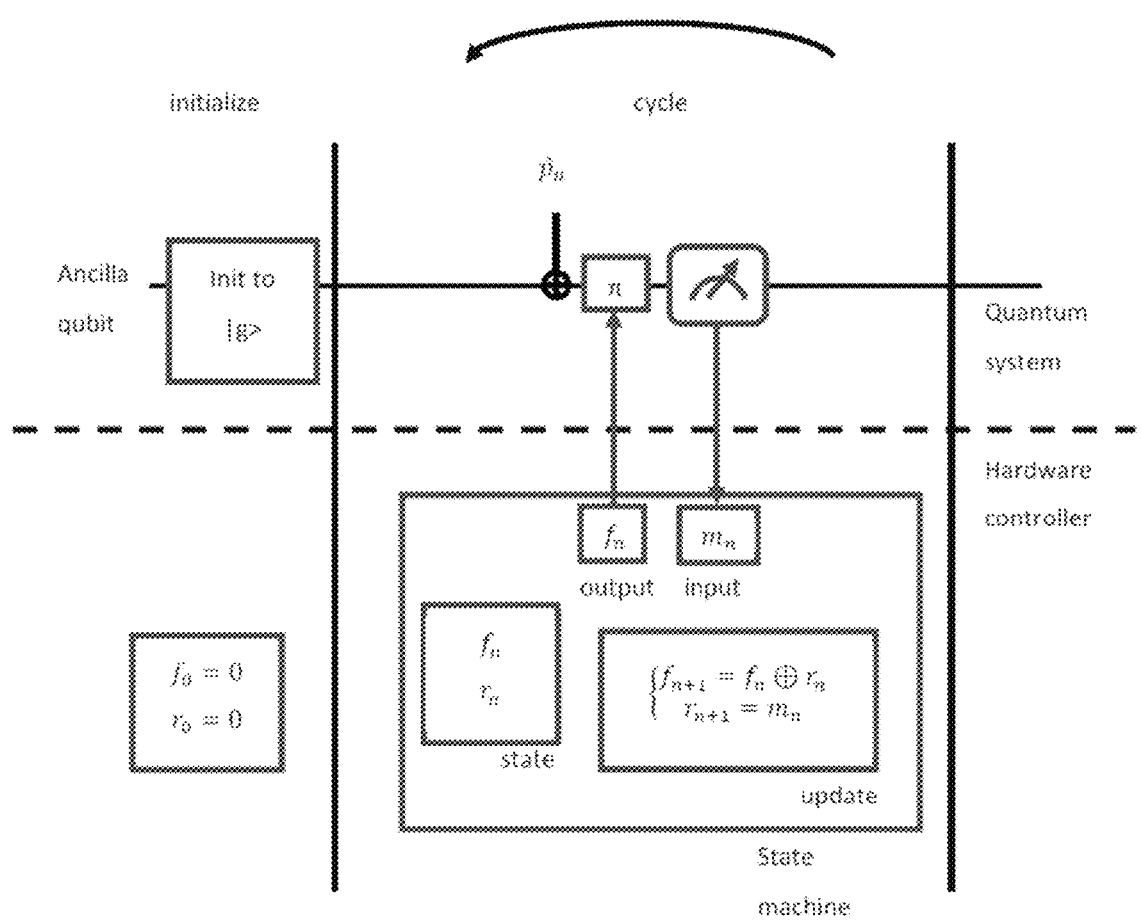
FIG. 1 is a depiction of the operating principle in accordance with an example embodiment of the invention

An example controller state machine logic is depicted in FIG. 1. The state machine has two binary states, r and f, which can take the values 0 and 1. At the beginning of the code operation, the controller states are initialized to 0, and the state of the ancilla qubit is initialized to the ground state (g). After the initialization step, the code cycle repeats at least once. During the cycle, at step n, the controller applies an operation that rotates the state of the ancilla by $\pi$ around an axis situated on the equator of the Bloch sphere if and only if $f_n=1$. The parity of the number of bit-flips of all other operations, quantum or otherwise, and intentional or otherwise, which are performed on the ancilla qubit during the cycle time, are denoted by $\hat{p}_n$. The state of the qubit is then measured and placed in the binary register $r_n$. The state machine then updates its state using the rule $f_{n+1}=f_n \oplus r_n$ and $r_{n+1}=m_n$.

When operated in the manner described above, the measurement outcomes $m_n$ correspond to error detection events $D_n$. Namely, $m_n=D_n$, where $D_n=\hat{p}_n \oplus \hat{p}_{n-1}$. This claim is proved in FIG. 6.

Figure 2:
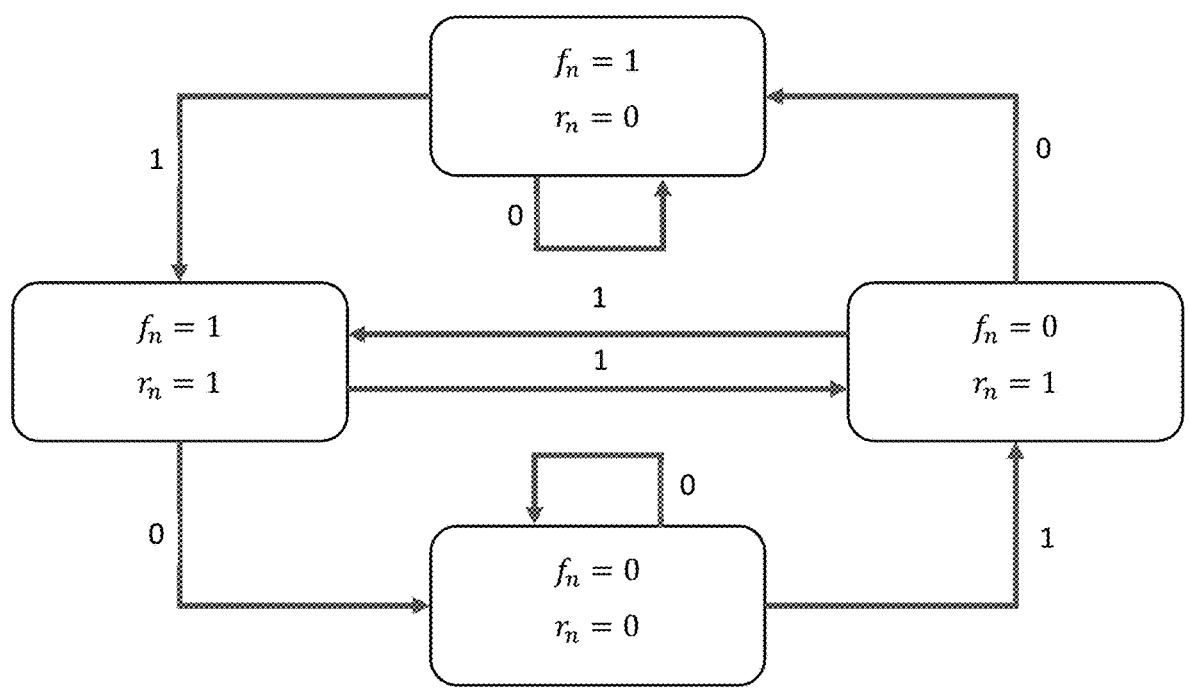
FIG. 2 illustrates and example of the states of the state machine which implements example aspects of the invention.

The state diagram of the state machine is shown in FIG. 2. The arrows correspond to the measurement outcome $m_n$ and the state corresponds to the binary values of $f_n$ and $r_n$.

Figure 3:
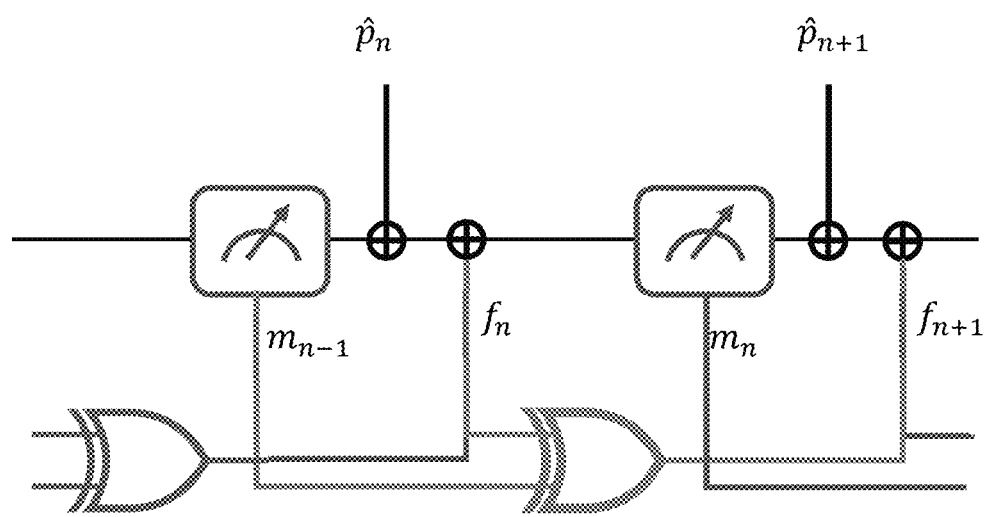
FIG. 3 is a general hybrid quantum/classical gate sequence which implements the example state machine described in FIG. 2, which sequence may continue indefinitely in both directions.

The state machine can also be described using a hybrid quantum/classical gate sequence as shown in FIG. 3. In this figure it is made clear that the operation applied at step n+1 depends on measurement outcomes from step n−1, since $f_{n+1}=f_n \oplus m_{n-1}$. In state of the art and representative quantum computing implementations, the feedback response latency is shorter than a single cycle time, and therefore this control mechanism allows the feedback response to be prepared in parallel with the non-conditional quantum operations performed by the controller. This parallelism is a fundamental part of the invention and provides the benefit that the feedback response time can be minimized.

Figure 4:
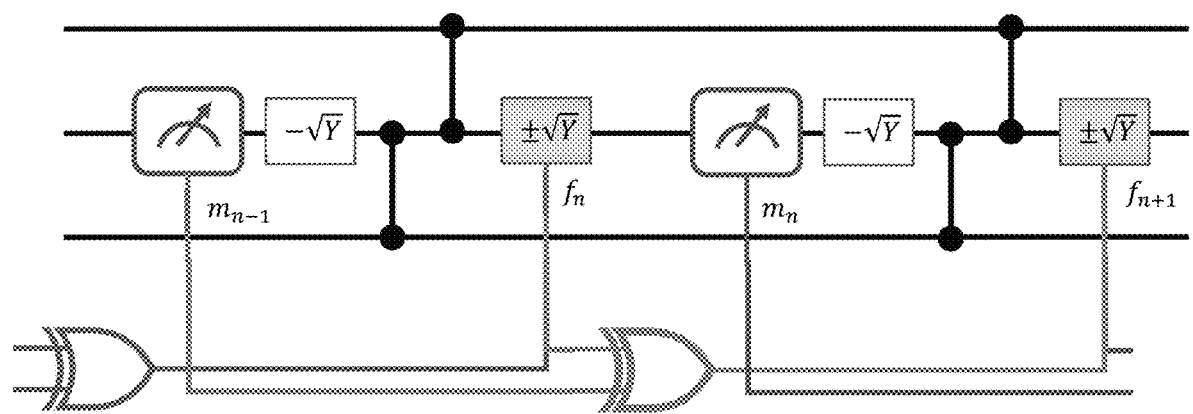
FIG. 4 is a specific non-limiting example of hybrid quantum/classical gate sequence for performing the improved error correction cycle which uses an ancilla qubit for the detection of bit flip errors on two adjacent data qubits

A more particular example of the operation of the controller is depicted in FIG. 4. This example is a particular representation of the invention and does not limit its scope. For this example, the state of the ancilla qubit is flipped by an integer number of $\pi$ rotations around a vector perpendicular to the equator, whose parity is $\hat{p}_n$. This parity is determined by the quantum state of two adjacent data qubits whose state is entangled with the state of the ancilla via CZ quantum gates. Additional single qubit $-\sqrt{Y}$ and a conditional operation which is equal to $\sqrt{Y}$ if $f_n=0$ and to $-\sqrt{Y}$ if $f_n=1$ performs the feedback control. In this example, no additional gates are required to perform the control operation. A pseudo-code implementation of this control logic is found in FIG. 7.

State of the art hardware control methods used for the purpose of sensing detection events use control mechanisms that are conditioned only on the measurement outcome at a particular cycle. These mechanisms have two disadvantages. The first is that feedback latency is necessarily added to the cycle time, which increases the error probability per cycle and thus may lower significantly the effectiveness of the code for certain implementations. The second is that the measurement outcomes do not directly represent the detection events, which are actionable and meaningful quantities extracted during the code cycle. Importantly, this means that the states of the ancilla measurement qubits are not controlled to be with high probability in specific states (e.g. the ground state), chosen to represent the no error detection state, which leads to sub-optimal error detection probabilities as we show in the next two paragraphs.

Figure 5:
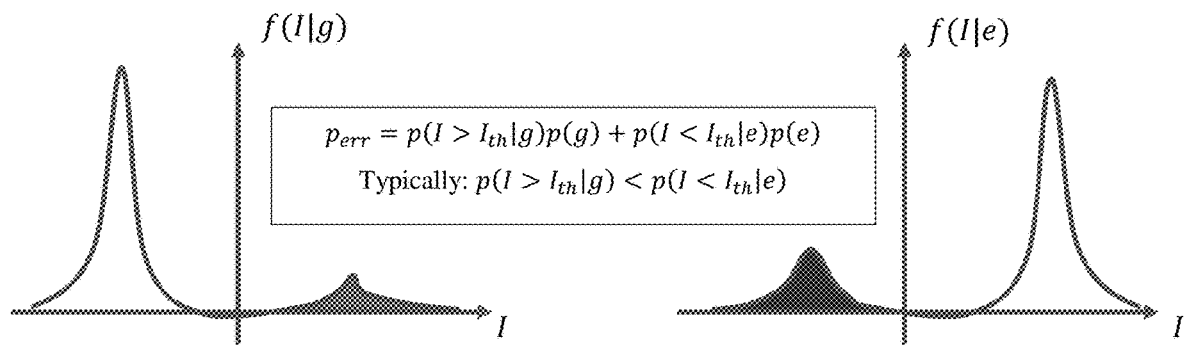
FIG. 5 is an example illustration of the expected benefit of the correction scheme.

A specific mechanism by which the measurement error probability of the ancilla qubits may be reduced is depicted in FIG. 5. The figure plots representative graphs of the likelihood probability density functions for the estimator of the state of the qubit. The likelihoods are defined given that the qubit was prepared in the ground state, f (I|g) (panel a) and in the excited state f(I|e) (panel b). The abscissa of the graph represents a value measured by the controller for the purpose of state estimation, and the ordinate represents the empiric frequency of a particular outcome I. Quantum state estimation is performed by calculating the sign of $I-I_{th}$, where $I_{th}$ is a threshold value chosen in an optimal manner. In this example we estimate excited state, e, when $I>I_{th}$ and ground state, g, otherwise. In typical scenarios the qubit tends to decay to the ground state during a quantum-non-demolition measurement, and therefore p $(I<I_{th}|e)>p$ $(I>I_{th}|g)$, where $p(I<x|a)=\int_{-\infty}^{x} f(x|a)dx$. Therefore, the estimation error, $p_{err}=p(I>I_{th}|g)p(g)+p(I<I_{th}|e)p(e)$ can be reduced by reducing the prior distribution p(e). As explained above, this prior distribution is minimized when the measurement outcomes $m_n$ provide the detection events $D_n$ directly, since in this case the ancillas are in the excited state for the minimal duration required to deduce a detection event. Moreover, the discrimination threshold, $I_{th}$, can also be optimized once the prior distribution p(e) is minimized to give the overall minimal error probability, $p_{err}$.

Furthermore, the discrimination threshold, $I_{th}$, can also be set during the execution of the detection protocol itself to reflect the prior knowledge of the previous measurements to reflect changes in, p(e), given different previous states, i.e. $p(m_n=e|m_{n-1}=e) \neq p(m_n=e|m_{n-1}=g)$. Here, again, real-time feedback is required where the new threshold is calculated during the time between the end of the previous measurement, $m_{n-1}$ and the discrimination stage of the current measurement, $m_n$. An optimal feedback latency would not limit this time.

Figure 8:
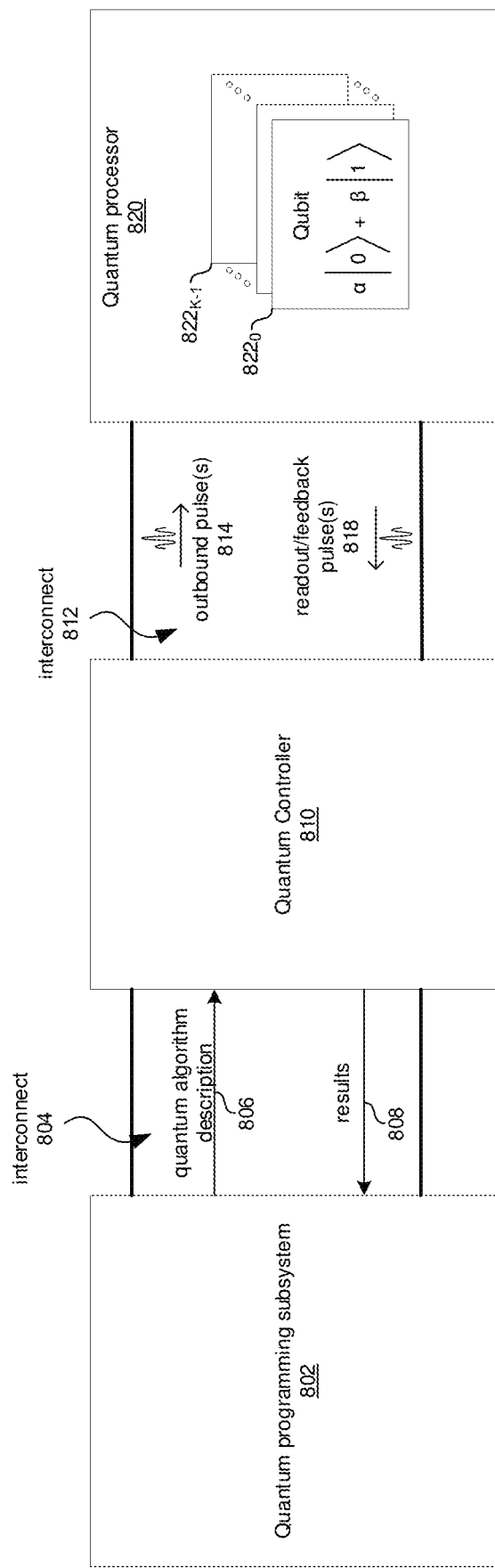
FIG. 8 shows an example quantum orchestration platform.

FIG. 8 shows an example quantum orchestration platform (QOP). The system comprises a quantum programming subsystem 802, a quantum controller 810, and a quantum processor 820.

The quantum programming subsystem 802 comprises circuitry operable to generate a quantum algorithm description 806 which configures the quantum controller 810 and includes instructions the quantum controller 810 can execute to carry out the quantum algorithm (i.e., generate the necessary outbound quantum control and readout pulse(s) 814, read and process the readout and feedback pulses 818, perform real-time decision making and other calculations, based or not based on measurements, to generate the appropriate control and readout pulses and process and stream results 808, etc.) with little or no human intervention during runtime. In an example implementation these results may be used to perform quantum error correction as described above in reference to one or more of FIGS. 1-7. The quantum controller 810 can perform the quantum error correction protocols described above in reference to FIGS. 1-7 with feedback latencies that for typical quantum processing units would not limit the protocol and the error detection cycle duration. In an example implementation, the quantum programming system 802 is a personal computer comprising a processor, memory, and other associated circuitry (e.g., an x86 or x64 chipset) having installed on it a quantum orchestration software development kit (SDK) that enables creation (e.g., by a user via a text editor and/or by automated quantum algorithm description generation circuitry) of a high-level (as opposed to binary or "machine code") quantum algorithm description 806. In an example implementation, the high-level quantum algorithm description uses a high-level programming language (e.g., Python, R, Java, Matlab, etc.) simply as a "host" programming language in which are embedded the QOP programming constructs.

The high-level quantum algorithm description may comprise a specification and a program. Although the specification and program may be part of one or more larger databases and/or contained in one or more files, the remainder of this disclosure will, for simplicity of description, assume the configuration data structure and the program data structure each takes the form of a plain-text file recognizable by an operating system (e.g., windows, Linux, Mac, or another OS) on which quantum programming subsystem runs. The quantum programming subsystem 802 then compiles the high-level quantum algorithm description 806 to a machine code version of the quantum algorithm description 806 (i.e., series of binary vectors that represent instructions that the quantum controller's hardware can interpret and execute directly). An example implementation of the data structures/vectors used for realizing the machine code version of the quantum algorithm description are described below.

The quantum programming subsystem 802 is coupled to the quantum controller 810 via interconnect 804 which may, for example, utilize universal serial bus (USB), peripheral component interconnect (PCIe) bus, wired or wireless Ethernet, or any other suitable communication protocol. The quantum controller 810 comprises circuitry operable to load the machine code quantum algorithm description 806 from the programming subsystem 802 via interconnect 804. Then, execution of the machine code by the quantum controller 810 causes the quantum controller 810 to generate the necessary outbound quantum control pulse(s) 814 that correspond to the desired operations to be performed on the quantum processor 820 (e.g., sent to qubit(s) for manipulating a state of the qubit(s) or to readout resonator(s) for reading the state of the qubit(s), etc.). Depending on the quantum algorithm to be performed, outbound pulse(s) 814 for carrying out the algorithm may be predetermined at design time and/or may need to be determined during runtime. The runtime determination of the pulses may comprise performance of classical calculations and processing in the quantum controller 810 and/or the quantum programing subsystem 802 during runtime of the algorithm (e.g., runtime analysis of inbound pulses 816 received from the quantum processor 820).

During runtime and/or upon completion of a quantum algorithm performed by the quantum controller 810, the quantum controller 810 may output data/results 808 to the quantum programming subsystem 802.

The quantum controller 810 is coupled to the quantum processor 820 via interconnect 812 which may comprise, for example, one or more conductors and/or optical fibers. The quantum controller 810 may comprise a plurality of interconnected, but physically distinct quantum control modules (e.g., each module being a desktop or rack mounted device) such that quantum control systems requiring relatively fewer resources can be realized with relatively fewer quantum control modules and quantum control systems requiring relatively more resources can be realized with relatively more quantum control modules. This enables a scalable quantum-computer-as-a-service architecture which can be hosted the cloud.

The quantum processor 820 comprises K (an integer) quantum elements 822, which includes qubits (which could be of any type such as superconducting, spin qubits, ion trapped, etc.), and, where applicable, any other element(s) for processing quantum information, storing quantum information (e.g. storage resonator), and/or coupling the outbound quantum control pulses 814 and inbound quantum control pulses 816 between interconnect 812 and the quantum element(s) 822 (e.g., readout resonator(s)). In an example implementation in which the quantum processor comprises readout resonators (or other readout circuitry), K may be equal to the total number of qubits plus the number of readout circuits. That is, if each of Q (an integer) qubits of the quantum processor 820 is associated with a dedicated readout circuit, then K may be equal to 2Q. For ease of description, the remainder of this disclosure will assume such an implementation, but it need not be the case in all implementations. Other elements of the quantum processor 820 may include, for example, flux lines (electronic lines for carrying current), gate electrodes (electrodes for voltage gating), current/voltage lines, amplifiers, classical logic circuits residing on-chip in the quantum processor 820, and/or the like.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical implementation may comprise one or more application specific integrated circuit (ASIC), one or more field programmable gate array (FPGA), and/or one or more processor (e.g., x86, x64, ARM, PIC, and/or any other suitable processor architecture) and associated supporting circuitry (e.g., storage, DRAM, FLASH, bus interface circuits, etc.). Each discrete ASIC, FPGA, Processor, or other circuit may be referred to as "chip," and multiple such circuits may be referred to as a "chipset." Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to perform processes as described in this disclosure. Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to be configured (e.g., to load software and/or firmware into its circuits) to operate as a system described in this disclosure.

As used herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As used herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As used herein, the term "exemplary" means serving as a non-limiting example, instance, or illustration. As used herein, the terms "e.g.," and "for example" set off lists of one or more non-limiting examples, instances, or illustrations. As used herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, the term "based on" means "based at least in part on." For example, "x based on y" means that "x" is based at least in part on "y" (and may also be based on z, for example).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or implementation to the teachings of the present disclosure without departing from its scope. Therefore, it is intended that the present method and/or system not be limited to the particular implementations disclosed, but that the present method and/or system will include all implementations falling within the scope of the appended claims.

The invention claimed is:

1. A system, comprising:
a quantum controller comprising a feedback controller, wherein:
the feedback controller is operable to measure one or more ancilla qubits in a quantum error correcting code,
the feedback controller is operable to generate a quantum feedback operation to control the one or more ancilla qubits,
the feedback controller comprises a state machine,
the state machine is configured to receive the measurements of the one or more ancilla qubits,
the state machine is operable to generate the quantum feedback operation according to the measurements of the one or more ancilla qubits and a state of the state machine,
the state machine comprises a logic circuit operable to generate the quantum feedback operation, and
the quantum feedback operation increases a probability that the one or more ancilla qubits will be subsequently measured in a specific state.

2. The system of claim 1, wherein:
the state machine comprises a logic circuit operable to provide an error detection event from the measurements of the one or more ancilla qubits.

3. The system of claim 1, wherein:
the specific state is a ground state.

4. The system of claim 1, wherein:
the quantum feedback operation is determined according to the increased probability that the one or more ancilla qubits will be measured in the specific state.

5. The system of claim 1, wherein:
the quantum feedback operation is determined by a state discrimination protocol.

6. The system of claim 5, wherein:
the feedback controller is operable to dynamically adjust the discrimination protocol according to previous measurements of the one or more ancilla qubits.

7. The system of claim 1, wherein:
the quantum feedback operation is determined by a state discrimination parameter.

8. The system of claim 7, wherein:
the state discrimination parameter is a state discrimination threshold.

9. The system of claim 7, wherein:
the feedback controller is operable to dynamically adjust the state discrimination parameter according to previous measurements of the one or more ancilla qubits.

10. The system of claim 1, wherein:
the feedback controller is operable to adjust, in real-time, a state discrimination according to the one or more ancilla qubits.

11. The system of claim 1, wherein:
the quantum feedback operation decreases a probability that the measurements of the one or more ancilla qubits will decay.

12. The system of claim 1, wherein:
the quantum feedback operation provides a higher measurement fidelity.

13. The system of claim 1, wherein:
the quantum feedback operation provides a shorter measurement time.

14. The system of claim 1, wherein:
the feedback controller is operable to determine error detection events in parallel with a generation of non-conditional quantum operations.

15. The system of claim 1, wherein:
the generation of the quantum feedback operation is a conditioned operation.

16. The system of claim 15, wherein:
the conditioned operation is performed without added latency, thereby reducing an error correction cycle time and errors per cycle.

17. The system of claim 1, wherein:
a measurement of the one or more ancilla qubits provide an error detection event, and readout errors in the error correcting code are reduced by maintaining the one or more ancilla qubits in a favorable state.

18. The system of claim 17, wherein:
the favorable state is a ground state.

19. A method, comprising:
measuring, via a feedback controller of a quantum controller, one or more ancilla qubits in a quantum error correcting code;
generating, via the feedback controller, a quantum feedback operation to control the one or more ancilla qubits;
receiving, via a state machine of the feedback controller, the measurements of the one or more ancilla qubits;
generating, via the state machine, the quantum feedback operation according to the measurements of the one or more ancilla qubits and a state of the state machine; and
increasing a probability, via the quantum feedback operation, that the one or more ancilla qubits will be subsequently measured in a specific state.

20. The method of claim 19, wherein the method comprises:
discriminating an error detection event from the measurements of the one or more ancilla qubits.

21. The method of claim 19, wherein:
the specific state is a ground state.

22. The method of claim 19, wherein the method comprises:
determining the quantum feedback operation according to the increased probability that the one or more ancilla qubits will be measured in the specific state.

23. The method of claim 19, wherein the method comprises:
determining the quantum feedback operation according to a state discrimination protocol.

24. The method of claim 23, wherein the method comprises:
dynamically adjusting the discrimination protocol according to previous measurements of the one or more ancilla qubits.

25. The method of claim 19, wherein the method comprises:
determining the quantum feedback operation according to a state discrimination parameter.

26. The method of claim 25, wherein the method comprises:
the state discrimination parameter is a state discrimination threshold.

27. The method of claim 25, wherein the method comprises:
dynamically adjusting the state discrimination parameter according to previous measurements of the one or more ancilla qubits.

28. The method of claim 19, wherein the method comprises:
adjusting, in real-time, a state discrimination according to the measurement of the one or more ancilla qubits.

29. The method of claim 19, wherein the method comprises:
decreasing a probability, via the quantum feedback operation, that the measurement of the one or more ancilla qubits will decay.

30. The method of claim 19, wherein the method comprises:
providing a higher measurement fidelity via the quantum feedback operation.

31. The method of claim 19, wherein the method comprises:
providing a shorter measurement time via the quantum feedback operation.

32. The method of claim 19, wherein the method comprises:
determining error detection events in parallel with generating non-conditional quantum operations.

33. The method of claim 19, wherein:
the generation of the quantum feedback operation is a conditioned operation.

34. The method of claim 33, wherein the method comprises:
reducing errors per cycle by performing the conditioned operation without added latency.

35. The method of claim 19, wherein the method comprises:
discriminating an error detection event according to a measurement of the one or more ancilla qubits; and
reducing readout errors in the error correcting code by maintaining the one or more ancilla qubits in a favorable state.

36. The method of claim 35, wherein:
the favorable state is a ground state.

* * * * *